United States Patent
Uemura

(10) Patent No.: US 7,433,934 B2
(45) Date of Patent: Oct. 7, 2008

(54) NETWORK STORAGE VIRTUALIZATION METHOD AND SYSTEM

(75) Inventor: Tetsuya Uemura, Sayama (JP)

(73) Assignee: Hitachi, Ltd., Tokyo (JP)

( * ) Notice: Subject to any disclaimer, the term of this patent is extended or adjusted under 35 U.S.C. 154(b) by 912 days.

(21) Appl. No.: 10/368,644

(22) Filed: Feb. 20, 2003

(65) Prior Publication Data
US 2004/0205143 A1 Oct. 14, 2004

(30) Foreign Application Priority Data
Feb. 7, 2003 (JP) ............................ 2003-030426

(51) Int. Cl.
*G06F 15/16* (2006.01)
(52) U.S. Cl. .................. 709/219; 709/208; 709/211; 711/4; 711/111; 711/112; 711/114; 711/202
(58) Field of Classification Search ................ 709/208, 709/211, 219; 711/4, 111, 112, 114, 202
See application file for complete search history.

(56) References Cited

U.S. PATENT DOCUMENTS

| | | | | | |
|---|---|---|---|---|---|
| 5,513,314 | A | * | 4/1996 | Kandasamy et al. ........... | 714/6 |
| 5,964,886 | A | * | 10/1999 | Slaughter et al. ............. | 714/4 |
| 6,029,168 | A | * | 2/2000 | Frey ............................ | 707/10 |
| 6,378,031 | B1 | * | 4/2002 | Kuno et al. .................... | 711/4 |
| 6,832,292 | B2 | * | 12/2004 | Tanaka et al. ............... | 711/114 |
| 2002/0003803 | A1 | * | 1/2002 | Kametani ................... | 370/401 |
| 2002/0083118 | A1 | * | 6/2002 | Sim .......................... | 709/105 |
| 2002/0156984 | A1 | * | 10/2002 | Padovano .................. | 711/148 |
| 2003/0037061 | A1 | * | 2/2003 | Sastri et al. ............. | 707/103 R |
| 2003/0084076 | A1 | * | 5/2003 | Sekiguchi et al. .......... | 707/205 |
| 2003/0115218 | A1 | * | 6/2003 | Bobbitt et al. ............. | 707/200 |
| 2003/0131182 | A1 | * | 7/2003 | Kumar et al. ................ | 711/5 |
| 2003/0140051 | A1 | * | 7/2003 | Fujiwara et al. ............ | 707/100 |
| 2003/0167340 | A1 | * | 9/2003 | Jonsson ..................... | 709/238 |
| 2003/0172149 | A1 | * | 9/2003 | Edsall et al. ............... | 709/224 |

* cited by examiner

*Primary Examiner*—William Vaughn
*Assistant Examiner*—Mohamed Ibrahim
(74) *Attorney, Agent, or Firm*—Mattingly, Stanger, Malur & Brundidge, P.C.

(57) ABSTRACT

A network storage system where the network storages are connected to clients. The system is resistive to faults and enables to access using the NFS standard protocol and allows clients access without regard to the interface even when the process is executed on any network storage. When a client has issued an access request to a first network storage, the first network storage transfers the request to a directory server storing file management information. The directory server selects a second network storage to process the request and transfers the request to the second network storage. The second network storage processes the request and transmits a packet to the client as if the process had been executed in the first network storage.

29 Claims, 8 Drawing Sheets

NETWORK STORAGE VIRTUALIZATION METHOD AND SYSTEM

FIELD OF THE INVENTION

The present invention relates to a network storage virtualization system and particularly to a network storage virtualization system which assures a flexible configuration and management of system through virtualizing network storages directly connected in direct to a network and enabling easier access to the network storages from a client.

BACKGROUND OF THE INVENTION

In the information processing system of the prior art, information has been stored to storage devices, hard disk drive for one, which is directly connected in direct to a computer system. Information stored in the storage devices may be accessed only from the computers directly connected to the storage devices. Therefore, to access the information from the other computer systems, it has been required to access via the computer directly connected to the storage devices.

However, the progress of a network technology and rapidly increasing in amount of information to be stored in recent years have caused to stimulate to separate a storage system to store information from a computer system to process information. As a result, a new storage system architecture has been developed. This storage system can realize sharing information among a plurality of computer systems through a network connection. A storage system to be connected to such network is referred to as a network storage.

As examples of such network storage, there have been proposed a SAN (Storage Area Network) storage which can provide a block access through the SAN connection, a NAS (Network Attached Storage) which can provide a file access through the IP network or the Infiniband connection, and a Web storage which can provide access profiles of a HTTP protocol used as an interface of Web access and an expanded protocol of the HTTP protocol.

With spread of network storage, a system manager is required to introduce management of a plurality of network storage connected to a network. For example, in the case where amount of data to be stored exceeds the maximum capacity of the existing network storage, it is required to add new network storages to reconfigure the system for reallocation of data or the like. Rapid growth of demand for storage capacity has imposed repeated reconfigurations of system and expanded system management cost.

In order to reduce system management cost, it is essential to introduce a storage virtualization technology with which a plurality of network storages are formed as a virtually single network storage from the computer system side and thereby any adverse effect like adding new network storages, is not spread to the system as a whole. Various systems have been developed and proposed in regard to such a storage virtualization technology.

For instance, the Zebra (refer to a non patent reference 1) presented by Hartman et. al. in 1995 proposes a system for storing a single file into a plurality of distributed network storages by striping this file. In this system, a file is divided in every constant length and sequentially stored into the network storages in round-robin fashion. In the Zebra reference, a server is provided for centralized management to know in what sequence files are stored in the distributed network storages. Therefore, this reference is characterized in that the data of file itself is accessed in the file access process after an inquiry is issued for information regarding the storing position of file to such management server. Namely, in the Zebra reference, a plurality of network storages are virtually formed as a large network storage by storing files into a plurality of distributed servers and centrally managing allocations of the files with a single server.

Moreover, a patent reference 1 by Alexander H. Frey et. al. proposes a system for striping file with non-centralized management servers system which are different from the centralized management server system of the Zebra reference. In this system, the striping information which has been in the centralized management server with the Zebra reference is stored for a distributed management in a plurality of distributed network storages by embedding starter node information which is storing the striping information of files into a file identifier. When a client wants to access to files, the client accesses first to the starter node to determine the storing position of files and transfers, if necessary, an access request to the server which is storing file blocks to be accessed because the starter node information is stored in the file identifier. Therefore, an access to the relevant file from a client can be realized only by issuing a request to the starter node, resulting in the merit that it is not requested to consider the storing position of files through the striping thereof.

Moreover, in the "distributed file management apparatus and distributed file management system" of the patent reference 2, status management sections are provided in a plurality of server computers for management of load by holding load information, while partial files of distributed files are identified by storing partial files forming a part or the entire part of the distributed files to a storage device and thereby a server computer for processing partial files based on the load information stored in the status management sections is determined. Accordingly, centralization of load to the particular server can be prevented.

LIST OF REFERENCES

Non Patent Reference 1:
   The Zebra Striped Network File System, Hartman et. al., ACM Transactions on Computer System, Vol. 13, No. 3, 1995, pp. 274-310.
Patent Reference 1:
   Specification of U.S. Pat. No. 6,029,168
Patent Reference 2:
   Japanese Patent Laid-Open No. 2000-207370

The Zebra reference of the prior art has a merit that a user can access to distributed files even when a user does not have detail information of these files. However, in the Zebra reference described above, it is required to issue an inquiry to the centralized management server for determining a network storage storing file pieces to be accessed and particularly for update of a file, data on the centralized management server also has to be updated in addition to data on the network storage. Accordingly, when the number of network storages increases, scalability of system is interfered because the centralized management server works as a bottleneck. In addition, here rises a problem that exclusive clients are required in the Zebra reference and therefore this reference cannot be applied to the standard protocol such as NFS.

Moreover, the non-centralized management server system of the patent reference 1 has solved the problem of the Zebra interference that the centralized management server works as a bottleneck in such a point that the management server is divided for a plurality of servers. However, in this system, it is a pre-condition for servers such as distributed directories to convert a uniquely identifying file name or directory name to a file identifier including an embedded starter node information at the time of file access and therefore information required for management of correspondence between servers for management of file storing place and file names is required additionally. In the embodiment of the patent reference 1, it is also described that a "well-known" distributed directory file is used as a means for storing such information. Moreover, because of directly embedding a position of starter node to the file identifier, when a new network storage is added to existing network storages and then to move the starter node of existing file to a new network storage, information which suggests correspondence between file names stored in the distributed directory and file identifiers must be updated. Therefore, here rises a problem that management cost for expansion of new network storage increases.

Meanwhile, the invention described in the patent reference 2 includes a problem that access is disabled when a fault is generated because redundancy of distributed file management means is not considered, although emphasis is placed in load balancing among a plurality of servers and particularly in load balancing to disk and network.

The present invention has been proposed to solve the problems described above and therefore a first object of the present invention is to provide a network storage virtualization method which may be accessed using the standard protocol such as NFS.

Moreover, a second object of the present invention is to provide a network storage virtualization method which requires lower management cost for expansion and reduction of network storages.

In addition, a third object of the present invention is to provide a network storage virtualization method which may be utilized continuously even when a fault is generated by giving redundancy to file management information.

Further, a fourth object of the present invention is to provide a network storage virtualization system in which a client can issue a request to the network storage without any consideration for difference between the network storage for receiving a request from a client and the network storage for transmitting response to a client after execution of the processes requested.

SUMMARY OF THE INVENTION

The network storage virtualization method of the present invention is utilized as described below in order to attain the objects described above.

A directory server for storing file management information is provided to a network storage virtualization system and when an access request is issued to the network storages from a client, a first network storage receives the request from the client and then transfers this received request to the directory server. The directory server selects a second network storage as the network storage to process the request based on the file management information and then transfers the request to the second network storage.

The second network storage processes the request and transmits the result of the request to a client as a response to the request.

Moreover, when a plurality of directory servers are provided, a directory server for transferring the received request is selected.

In this case, the second network storage transmits the result of processes with inclusion of a response which suggests as if the request were processed by the first network storage. Therefore, a client is not required to know which network storages have conducted processes.

In addition, it is also possible to notify to the first network storage that the second network storage has been selected as the network storage to process the request by the directory server. If the notified content is stored in the first network storage, the request can be directly transferred to the second network storage when the second access is made to the file in the first network storage.

Moreover, file management information of the directory server is divided to also store the divided information in a plurality of network storages and when a client issues an access request to the network storages, a first network storage having received the request from the client selects the directory server or a second network storage for transfer of request and transfers the request to the selected directory server or the second network storage.

The selected directory server or the second network storage transfers a third network storage for processing of the request to realize the processes in this third network storage.

The file management information divided and stored in the directory server and the network storages has to be stored under the condition that maintain consistency.

Thereby, since the file management information is placed under the distributed fashion, redundancy increases and security of system can also be enhanced.

In addition, it is also allowed that when an access request is issued to a network storage from a client, the network storage having received the request transmits an inquiry to a directory server for a network storage to process the received request and causes this directory server to transmit a notification, and the network storage having received the request transfers the request to the network storage for processing the request.

In this network storage virtualization method, the system can be configured with the standard protocol and a client is not required to consider the particular protocols and specifications. Moreover, expansion of system required when the capacity of files has increased can be realized easily by adding the network storages.

Furthermore, since the file management information is stored in the distributed fashion, reliability of the system is raised enough to realize continuous operation even when a fault occurs in a part of directory servers or network storages.

DETAILED DESCRIPTION OF THE PREFERRED EMBODIMENTS

The preferred embodiments of the present invention will be described with reference the accompanying drawings from FIG. 1 to FIG. 8.

[System Configuration of Network Storage System of the Present Invention]

First, a system configuration of network storage system of the present invention will be described with reference to FIG. 1.

Figure 1:
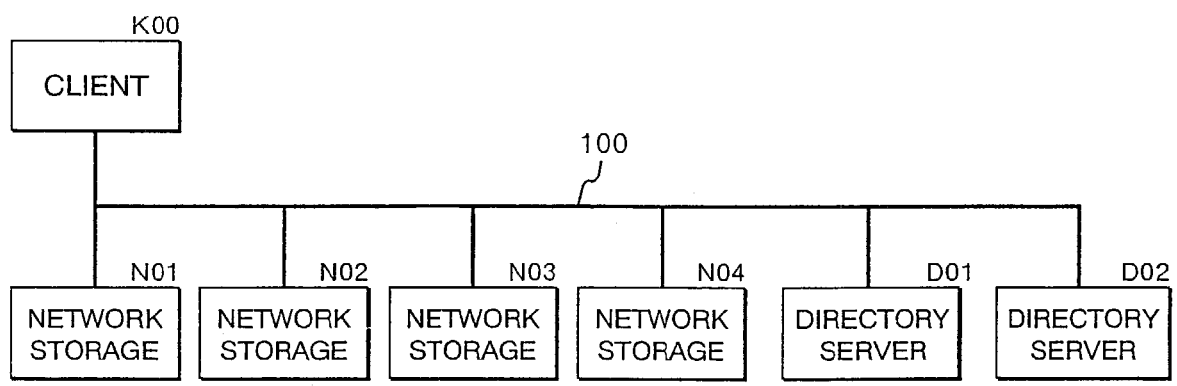
FIG. 1 is a system configuration diagram of a network storage system of the present invention.

FIG. 1 is a system configuration diagram of network storage system of the present invention.

The network storage system of the present invention is comprised of a client K00, network storages N01 to N04 and directory servers D01, D02, which are connected with a LAN 100.

The client K00 issues a file access request to a server, for read and write operations of file and acquisition of file management information.

The network storages N01 to N04 are storage devices directly connected to the network providing a service of storing data of files.

The directory servers D01, D02 store file management information consisting of information of network storage which stores file attribution and the network storages storing o files.

In an example of FIG. 1, four network storages and two directory servers are used but the network storages may be expanded depending on the scale of system, while the directory servers may be provided adequately depending on capacity of file management information and performance of server.

Embodiment 1

Next, a first embodiment of the present invention will be described with reference to FIGS. 2A, 2B to FIG. 5.

Figure 2A:
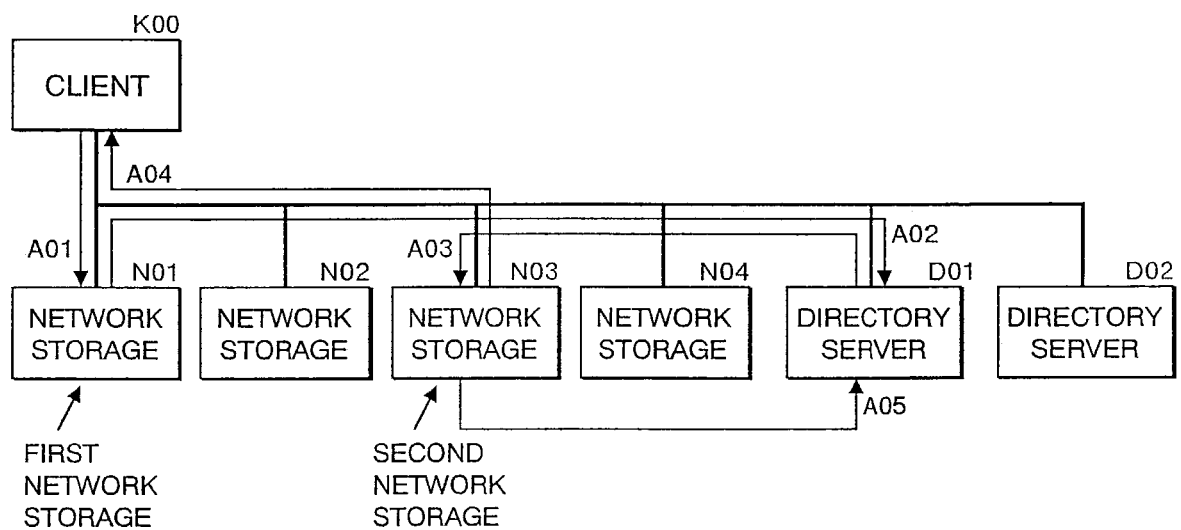
FIG. 2A and FIG. 2B are schematic diagrams illustrating flows of processes in a first embodiment of the present invention.
Figure 2B:
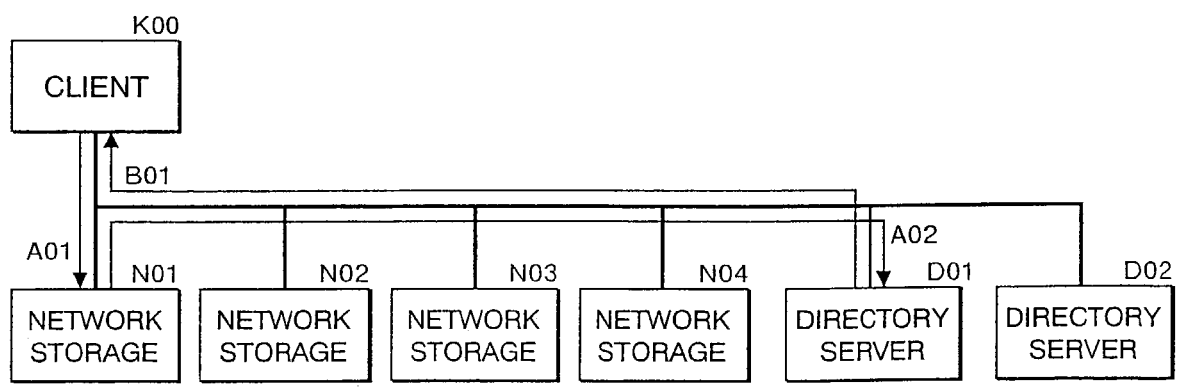

FIG. 2A and FIG. 2B are schematic diagrams illustrating flow of processes in the first embodiment of the present invention.

Figure 3:
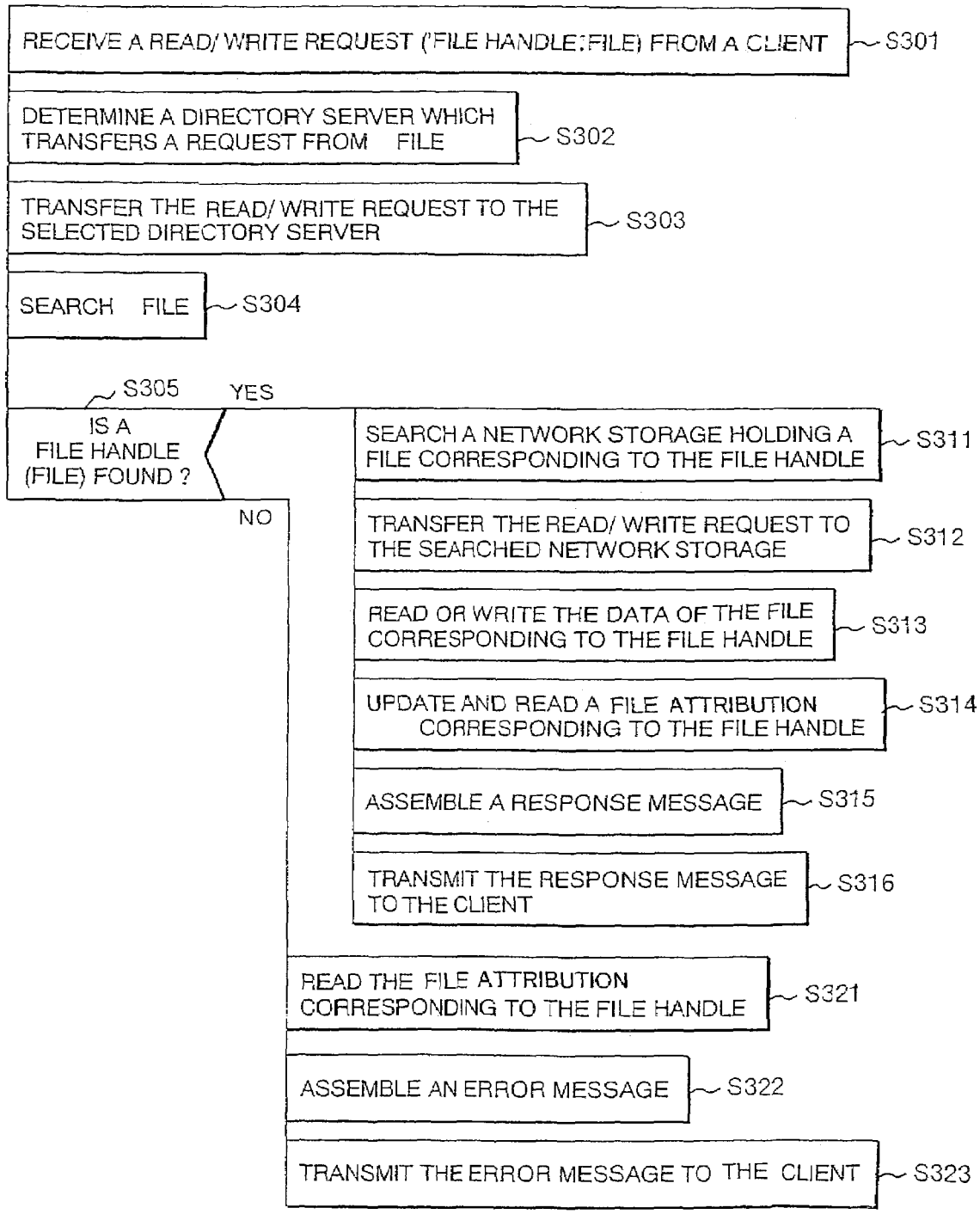
FIG. 3 is a PAD (Problem Analysis Diagram) illustrating flow of processes when a READ/WRITE request is issued from a client.

FIG. 3 is a PAD (Problem Analysis Diagram) illustrating processes when a READ/WRITE request is issued from a client.

Figure 4:
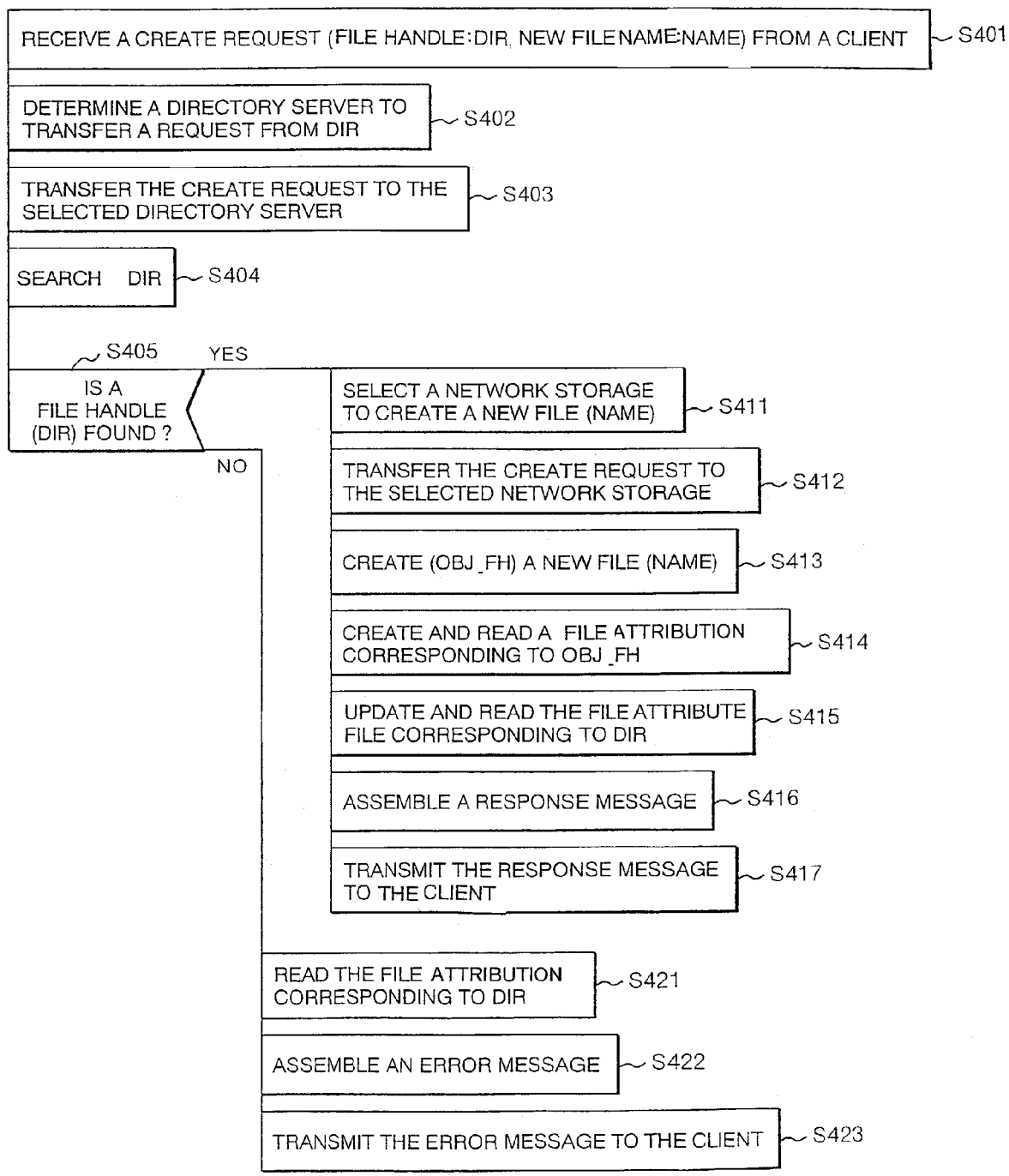
FIG. 4 is a PAD diagram illustrating flow of processes when a CREATE request is issued from a client.

FIG. 4 is a PAD illustrating processes when a CREATE request is issued from a client.

Figure 5:
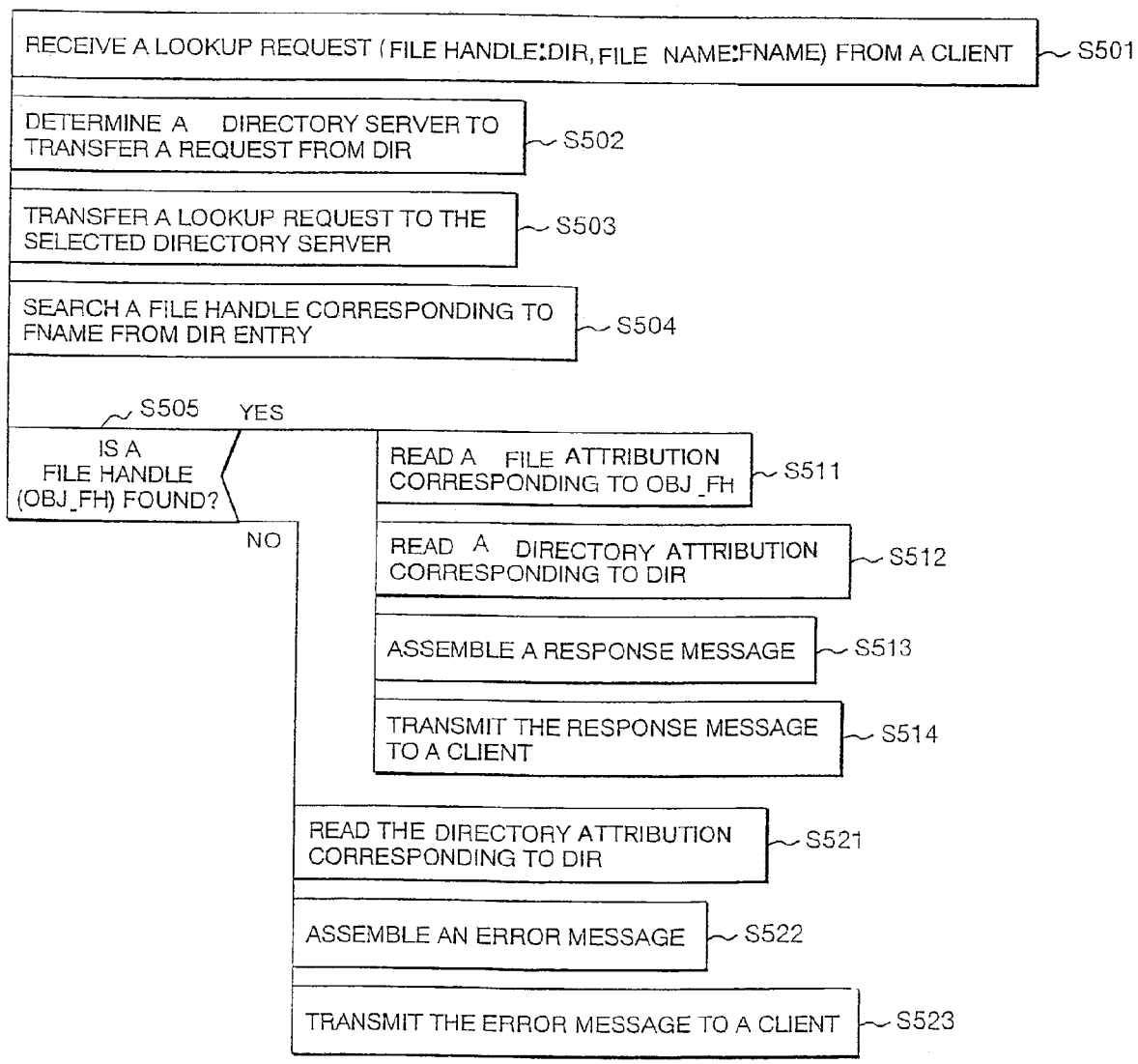
FIG. 5 is a PAD diagram illustrating the flow of processes when a LOOKUP request is issued from a client.

FIG. 5 is a PAD illustrating processes when a LOOKUP request is issued from a client.

In this embodiment, a network storage virtualization method with which a client K00 communicates using a NFS protocol described in the RFC 1813 (NFS Version 3 Protocol Specification) will be described. The NFS (Network File System) is a distributed file system used in the TCP/IP environment as a standard protocol. Operations of the network virtualization method will be described in the examples of READ, WRITE, CREATE and LOOKUP which are typical protocols of NFS and the other NFS protocols may also be considered in the same manner.

(I) Summary of Processes in Network Storage Virtualization Method

First, summary of the processes by the network storage virtualization method of the present invention will be described with reference to FIG. 2A and FIG. 2B.

FIG. 2A illustrates flow of processes when a request from a client accesses to both file and file management information. The READ, WRITE and CREATE protocols are the case of these processes.

In this flow of processes, a client K00 issues a file access request to a network storage N01 (a first network storage) via the LAN (A01). Since file management information is stored in a directory server, the network storage N01 selects a directory server D01 storing the file management information of such file and transfers thereto the access request (A02).

In this case, the network storage N01 transfers information including IP addresses of the client and the first network storage N01, transmitting and receiving port number and transaction ID of READ/WRITE request.

The directory server D01 searches a network storage storing such a file and then transfers the request to the relevant network storage N03 (a second network storage) (A03) together with the information transferred including IP addresses of a client and the first network storage N01 and the like.

The network storage N03 returns a response to the client K00 by processing the request received (A04). In this case, the file management information is read and updated in the directory server D01 for the update process of file management information such as file access time (A05).

It should be noted here that the second network storage N03 to process virtually acts to suggest as if the request were processed in the first network storage N01. Namely, since information including IP addresses of a client and the first network storage N01 is transferred to the second network storage N03, the IP address of first network storage N01 is included to the response packet of the second network storage N03 and the session in which the file access request is issued from the client K00 can be relayed.

Thereby, it is not required to become conscious of, when observed from the client K00, the network storage to process the request.

FIG. 2B illustrates flow of processes for making access only to file management information by the request from the client. The protocol such as LOOKUP, for example, corresponds to this access.

In this process, the client K00 first issues a file access request to the desired network storage N01 on the system via the LAN (A01). The file management information is stored in a directory server. Therefore, the network storage N01 selects the directory server D01 in which the file management information of file is stored and transfers this request thereto (A02).

The directory server D01 processes the received request and returns a response to the client K00 (A04).

The request of this type is only access to the file management information and therefore the request can be processed only in the directory server.

(II) Detail Processes in Network Storage Virtualization Method

Next, detail processes in the network storage virtualization method of the present invention will be described for each protocol with reference to FIG. 3 to FIG. 5.

(a) READ/WRITE Protocol

The READ/WRITE request of NFS is a protocol to read and write data from and to a file. Moreover, this protocol has an interface to return the file attribution in addition to writing and reading data to and from the file designated with a file handle (file).

The file handle is an identifier for processing information corresponding to a file in the NFS.

First, the client K00 issues the READ/WRITE request for the file handle (file) to the network storage N01 (A01 in FIG. 2A).

The network storage N01 receives the READ/WRITE request from the client K00 (S301). In the NFS, the file handle has a variable value in maximum value of 64 bytes.

Since two directory servers D01, D02 are provided in this system, it must be determined to which directory servers between D01 and D02 the process is requested to process based on the file handle. This determination method includes, for example, the one where the directory servers are mutually switched by round-robin fashion or the other where the directory server is determined with a remainder of 2 of the file handle. In the subsequent description, it is assumed that the directory server is determined depending on a remainder. When the remainder is 0 (the least significant bit of file handle is 0), the directory server D01 is selected and when the remainder is 1 (the least significant bit of the file handle is 1), the directory server D02 is selected. Here, it is assumed that the directory server D01 is temporarily selected (S302).

When it is requested to update a file attribute, a directory server for processing the particular file handle can be uniquely designated by selecting a directory server depending on a remainder. Therefore, it is now possible to eliminate occurrence of situation that the file attribute is updated for the same file handle with two directory servers and thereby the consistency of data is lost.

Of course, a desired means for coupling one to one the file handle and directory server can be used, in addition to the method where a remainder of file handle is used for selection of such directory servers.

Next, the network storage N01 transfers the received READ/WRITE request to the directory server D01 (S302, A02 of FIG. 2A). Here, the information required for creating a response message including a IP address of client K00, IP address of network storage N01, port number for transmission and reception of TCP or UDP, transaction ID of RPC (XID), program number of RPC, version number of RPC, procedure number of RPC and authentication information of RPC and verification information of RPC and the like is all transferred.

The directory server D01 having received the transferred request searches a file handle (file) (S304) and verifies whether this file handle is the one existing actually or not (S305). When the file handle (file) is found, the process goes to the step S311 but if the file handle is not found, the process goes to the step S321.

When the file handle (file) is found, the network storage storing the data of a file corresponding to the file handle (file) is searched (S311). Here, it is assumed that the network storage N03 holds the data of the file. The READ/WRITE request is transferred to this network storage N03 (S312, A03 of FIG. 2A).

The information including IP addresses of the client K00 and network storage N01 and the like is also transferred here simultaneously as described above.

The network storage N03 having received this request reads or writes the data of the file corresponding to the file handle (file) (S313).

When the file is read or written, it is requested to update a file attribution such as access time. Therefore, it is requested to the directory server D01 to update a file attribution of the file handle (file) and read the file attribution (S314, A05 of FIG. 2A). Here, a response message is assembled (S315). Moreover, the network storage N03 assembles a response message causing the client K00 to recognize the response is issued from the network storage N01 by utilizing the information including IP addresses of the client K00 and network storage N01 transferred together with the request. Finally, the assembled response message is transmitted to the client K00 (S316, A04 of FIG. 2A).

When the file handle is not found, a file attribute of the file handle is read (S321) and an error message is assembled (s322). Here, as in the case where the file handle is found, the directory server D01 assembles an error message, urging the client K00 to recognize this error message as that transmitted from the network storage N01, using IP address of the client K00 and network storage N01 transferred together when the request is transferred. Finally, the assembled error message is transmitted to the client K00 (S323, A04 of FIG. 2A).

In the process of this READ/WRITE request, a load of directory servers can be balanced by selecting the directory server for transferring of a request in the step S302 and then actually transferring the request thereto. Moreover, the information such as IP address of the client K00 and network storage N01 and the like is also transferred when the request is transferred in the step S303 and thereby the network storage N03 and the directory server D01 assemble a response message in the steps S315 and S322 and then transmit the message to the client K00 in the step S316 and S323 to suggest as if the network storage N01 has assembled the message. Accordingly, the client K00 is not requested to consider in which network storage the process has been executed.

In addition, since the unique directory server is determined to process the file attribute for each file handle, consistency of data in a couple of directory servers can be assured when the file attribute is updated.

Moreover, loads of network storages can be balanced by transferring the READ/WRITE request to a plurality of network storages.

(b) CREATE Protocol

A CREATE request of the NFS is the protocol to create files in the designated directory. This CREATE request has an interface that newly creates a file in the file name (name) on the directory designated with a file handle (dir) and return the file handle (obj_fh) of the file created and transmits attributions of the file and the directory.

First, the client K00 issues, to the network storage N01, the CREATE request to newly create a file in the file name (name) on the file handle (dir) (A01 of FIG. 2A).

The network storage N01 receives the CREATE request from this client K00 (S401). In the NFS, the file handle has a variable length value in the maximum of 64 bytes as described above.

This network storage N01 determines, based on this file handle, the directory server D01 or D02 to which the execution of process is requested (S402).

As in the case of the READ/WRITE request, a directory server which is asked to process with a remainder of file handle is also determined. It is now possible, by selecting the directory server with the remainder, to eliminate the situation that two directory servers create simultaneously the same file name on the same directory and thereby the consistency of data is lost. Here, it is assumed that the directory server D01 is temporarily selected.

The network storage N01 transfers the received CREATE request to the selected directory server D01 (S403, A02 of FIG. 2A). Here, the information required to create of a response messages including the IP address of client K00, IP address of network storage N01, transmission and reception port number of TCP or UDP, transaction ID of RPC (XID), program number of RPC, version number of RPC, procedure number of RPC, authentication information of RPC and verification information of RPC and the like is transferred.

The directory server D01 having received the transferred request searches the file handle (dir) (S404) to verify whether it is the file handle of the actually existing directory or not (S405). When the file handle dir is found, the process goes to the step S411, but if the file handle dir is not found, the process goes to the step S421.

When the file handle (dir) is found, a network storage that create a new file having the file name (name) is selected (S411). To select a network storage, it is enough to select the network storage having the lowest load with the method described below. First, a disk capacity usage (U %) of each network storage is obtained. Next, a network bandwidth usage (B %) of each network storage is obtained. Moreover, each network storage is evaluated based on the evaluation formula $\alpha \times U + \beta \times U$ where the parameters $\alpha$ and $\beta$ should be separately established to give priority to a disk capacity or a network bandwidth. Here, $\alpha$ and $\beta$ are positive values. This evaluation formula means that the larger is the value of the evaluation formula, the larger is the load of a disk and/or a network of network storage. Therefore, it is reasonable to select the network storage having a smaller value of the evaluation formula.

Here, it is assumed that the network storage N03 is selected. In this case, the CREATE request is transferred to the network storage N03 (S412, A03 of FIG. 2A). Here, the information including IP address of the client K00 and the network storage N01 and the like is also transferred simultaneously as described above.

The network storage N03 creates a file data entry and file handle obj_fh having the file name (name) (S413). With the method described for READ/WRITE request, a directory server is selected from the remainder of file handle obj_fh. Here, it is assumed that the directory server D01 is selected. The network server N03 requests to the directory server D01 to create and read a attribution of the file handle obj_fh (S414, A05 of FIG. 2A).

Next, the network storage N03 requests to the directory server D01 to update and read a file attribution of directory (dir) (S415, A05 of FIG. 2A). Here, the network storage A03 assembles a response message (S416). Namely, the network storage N03 assembles a response message urging the client K00 to recognize the response from the network storage N01 using the information including IP addresses of the client K00 and the network storage N01 and the like transferred simultaneously with the transferred request. Finally, the response message assembled in the step S417 is transmitted to the client K00 (S417).

When (dir) is not found, the file attribution of directory of (dir) is read (S421) and the directory server D01 assembles an error message (S422). Here, the directory server D01 assembles a response message urging the client K00 to recognize the response from the network storage N01 using the information including IP addresses of the client K00 and the network storage N01 and the like transferred simultaneously to the transferred request. Finally, the assembled error message is transmitted to the client K00 (S423, A04 of FIG. 2A).

In the case of process of this CREATE request, as in the case of READ/WRITE request, loads of directory servers can be balanced by determining the directory server to transfer the request in the step S402.

Moreover, since the information including IP addresses of the client K00 and the network storage N01 and the like is transferred when the request is transferred in the step S403 and the response is sent to the client K00 in the steps S416 and S422 to suggest as if the message has been assembled by the network storage N01, the client K00 is not requested to consider in which network storage the process has been executed.

In addition, since a unique directory server is determined to process a file creation and a file attribution for each file handle of a directory, consistency of data in a couple of directory servers can be assured when the files are created and the file attribute is updated. Moreover, the ideal load balancing of the network storages can be realized by selecting the network storage having a less load and then transferring the CREATE request thereto.

(c) LOOKUP Protocol

The LOOKUP request of NFS is a protocol to return the information related to the file for the designated file name. Namely, this LOOKUP protocol has an interface to return a file handle (obj_fh) of file, a file of attribution (obj_attr) and a file attribution of directory (dir_attr) for the file having the file name (fname) existing on the directory designated with file handle (dir).

In the LOOKUP request, the client K00 issues the LOOKUP request to the network storage N01 in regard to the file having the file name (fname) on the file handle (dir) (A01 of FIG. 2B).

The network storage N01 receives the LOOKUP request from this client K00 (S501, A01 of FIG. 2B).

Here, based on the file handle, it is determined which directory servers D01 or D02 should process the request (S502). A determination method can be equal to the method described above in the READ/WRITE protocol processing. Here, it is assumed that the directory server D01 is selected.

The network storage N01 transfers the received LOOKUP request to such directory server D01 (S503, A02 of FIG. 2B). Here, the information required to create a response message including the IP address of client K00, IP address of network storage N01, transmission and reception port number of TCP or UDP, transaction ID of RPC (XID), program number of RPC, version number of RPC, procedure number of RPC, authentication information of RPC, verification information of RPC and the like is completely transferred.

The directory server D01 having received the transferred request searches the file handle (obj_fh) of file having the file name (fname) on the entry of file handle (dir) (S504). When the file handle (obj_fh) is found, the process goes to the step S511 but if not found, the process goes to the step S521.

When the file handle (obj_fh) is found, a file attribution of obj_fh is read (S511) and a directory attribute of (dir) is also read (S512). The directory server D01 then assembles a response message using these information (S513). Here, the directory server D01 assembles a response message urging the client K00 to recognize the response from the network storage N01 using the information including IP addresses of the client K00 and the network storage N01 and the like transferred simultaneously with the transferred request. Finally, the assembled response message is transmitted to the client K00 (S514, B01 of FIG. 2B).

If the file handle (obj_fh) is not found, the directory attribute of (dir) is read (S521) and an error message is assembled (S522). Here, as in the case where the file handle (obj_fh) is found, the directory server D01 assembles an error message urging the client K00 to recognize the error message from the network storage N01 using the information including IP addresses of the client K00 and the network storage N01 and the like transferred simultaneously with the transferred request. Finally, the assembled response message is transmitted to the client K00 (S523, B01 of FIG. 2B).

In this process for the request, it should be noted that the directory servers are processing without interventions of the network storages.

In the process for the LOOKUP request, load of directory servers can be balanced by determining the server to transfer the request in the step S502. Moreover, since the information including IP addresses of the client K00 and the network storage N01 and the like is also transferred when the request is transferred in the step S503 and thereby the client K00 can recognize as if the network storage N01 has assembled the message in the steps S513 and S522, the client K00 is not requested to consider with which directory server the response can be returned.

(III) Duplication of Directory Servers and Storing Profile of File Data and File Management Information In above description, there are two directory servers and the directory server to be used is selected by a file handler. In the network storage virtualization method of the present invention, the system can also be configured even when only one directory server is used. However, loads can also be balanced for the processes in regard to file management information by introducing a plurality of directory servers.

Moreover, it is more effective to store a subset of the file management information exclusively divided from the whole file management information, into each directory server and to select a directory server by using a file handle.

However, for improvement of reliability, it is preferable to store the file management information to a plurality of directory servers through multiplexing. In the case where the same file management information is held in a plurality of directory servers, when the file management information of a certain directory server is updated, it is required to also synchronously update the file management information in the other directory servers by transmitting a message thereto in the adequate timing in order to maintain the consistency of the file management information.

Here, in order to improve reliability of the file data, it is preferable that a file is multiplexed and a plurality of network storages store the same file redundantly. In this case, it is easily realized to manage a file multiplexed in a plurality of network storages if there are a plurality of directory servers storing file management information associated with a file handler and then each directory server manages the network storages storing the same file associated with a file handler redundantly.

In addition, in this embodiment, a file handle and the management information corresponding to such file handle are set in pair for management. However, the network storage of the present invention can also be applied easily to the method where a file data can be divided into many pieces and these file data pieces can be distributed and stored in a plurality of network storages by setting for management a set of the file handle, the management information associated with the file handle and offset information of the file. By using this method-, Stripe of file like the Zebra file system and data redundancy means like RAID 5 can also be introduced if a file divided into many pieces and these file data pieces are distributed and stored in a plurality of network storages.

As described above, when a plurality of directory servers and a plurality of network storages are prepared and file management information and file data are stored redundantly, even if a fault is occurred in a certain directory server and/or network storage, fail-over can be realized easily by utilizing the other directory servers and/or the other network storages.

(IV) Regarding Communication Profile

In this embodiment, even in the case where a client transmits a request to a network storage with the NFS protocol and the final response is returned to the client from the network storage which is different from the storage having received the request, a response message is created like the response from the network storage which has received the request first and it is then returned to the client. Namely, the client is capable of accessing to the virtualized network storage using the standard protocol such as NFS without requiring particular protocol and software.

It is of course possible to easily realize the network storage virtualization method even by utilizing the protocols other than the NFS for the communications with the client.

Moreover, in the network storage virtualization method of the present invention, since communication between network storages and directory servers is not required to exhibit to clients, another LAN to communicate with the network storages and the network storages is formed in addition to the LAN connected to the clients and the communication bandwidth of LAN connected to the clients can be saved by making communication using such another LAN.

(V) Regarding Expandability of System

In the network storage virtualization method of the present invention, network storages store the file data and directory servers store management information of files. Therefore, expansion of disk capacity of a network storage virtualization system can be realized only by connecting new network storages to the network. In this case, since it is not required to change allocation of file management information, any procedure is not required for changing configurations of allocation and thereby management cost can be lowered at the time of expansion of network storages. In addition, in the case of reduction of network storages, it is also not required to change allocation of file management information and therefore management cost can also be lowered for reduction of network storages.

Embodiment 2

Next, a second embodiment of the present invention will be described with reference to FIGS. 6A and 6B.

Figure 6A:
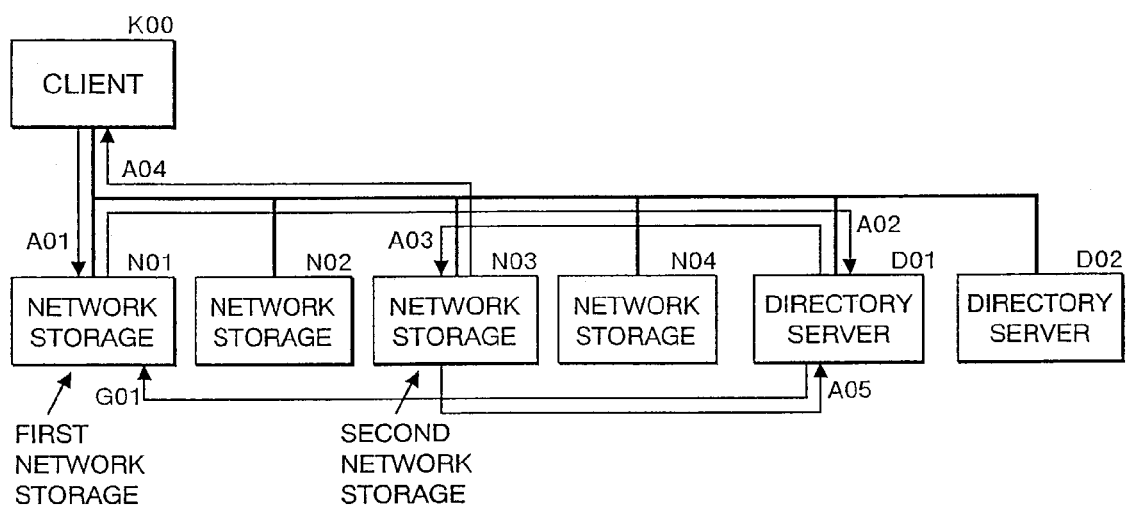
FIG. 6A and FIG. 6B are schematic diagrams illustrating flows of processes in a second embodiment of the present invention.
Figure 6B:
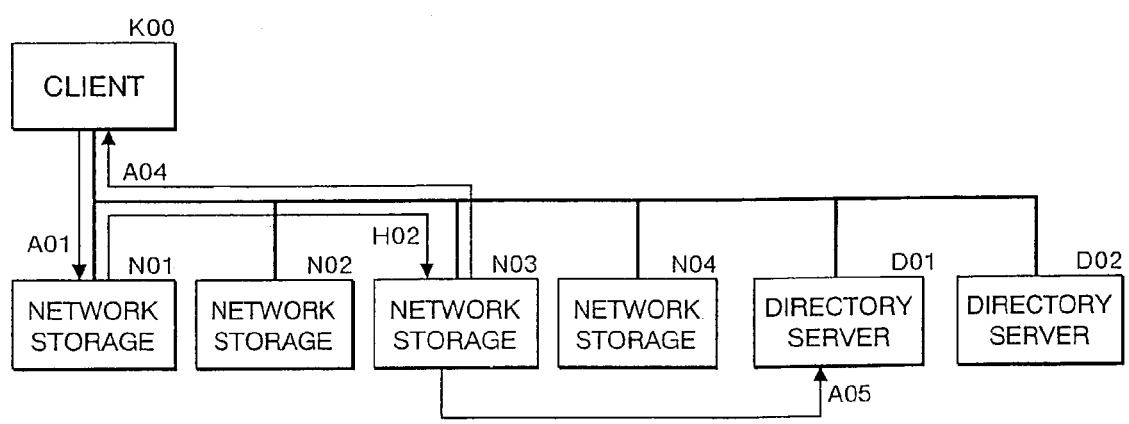

FIG. 6A and FIG. 6B are schematic diagrams illustrating flow of processes of the second embodiment of the present invention.

This embodiment is intended to improve processing performance, by expanding the functions of the first embodiment, when the second access is made to the same file that a client accessed previously.

FIG. 6A illustrates a flow of processes when the first process request is sent to the network storage N01 (first network storage) from the client K00. The processes of A01 to A04 are similar to that in the first embodiment.

Only difference is that the directory server D01 notifies to the network storage N01, that the file is stored in the network storage N03 (G01), for example, in the profile of forming a pair with a file identifier and a network storage, simultaneously with transfer of the request to the network storage N03 (second network storage) (A03) wherein files are stored.

In this timing, since the network storage N01 and network storage N03 are operating in parallel, the processing performance of the system is not so much lowered.

In the network storage N01, correspondence between a file identifier and a network storage identifier is stored in a temporary storage area as a cache.

It is assumed that, under this condition, the client K00 has issued a file access request of the same file to the network storage N01 as illustrated in FIG. 6B.

In this case, the network storage N01 searches first whether correspondence between the file identifier associated with file and a network storage identifier is stored in the temporary storage area or not. When such correspondence is found, the request is directly transferred to the network storage N03 (H02). Thereafter, the network storage N03 processes the request and then transmits a response to the client (A04) as described in the case of first embodiment. When such correspondence is not found, the relevant directory server D01 is selected and the request is transferred thereto like FIG. 6A (A02).

According to this embodiment, the processing performance can be improved remarkably because when information related to files already accessed is stored in the temporary storage area, the request can be directly transferred to the network storage N03 without via the directory server D01.

Embodiment 3

Next, a third embodiment of the present invention will be described with reference to FIGS. 7A and 7B.

Figure 7A:
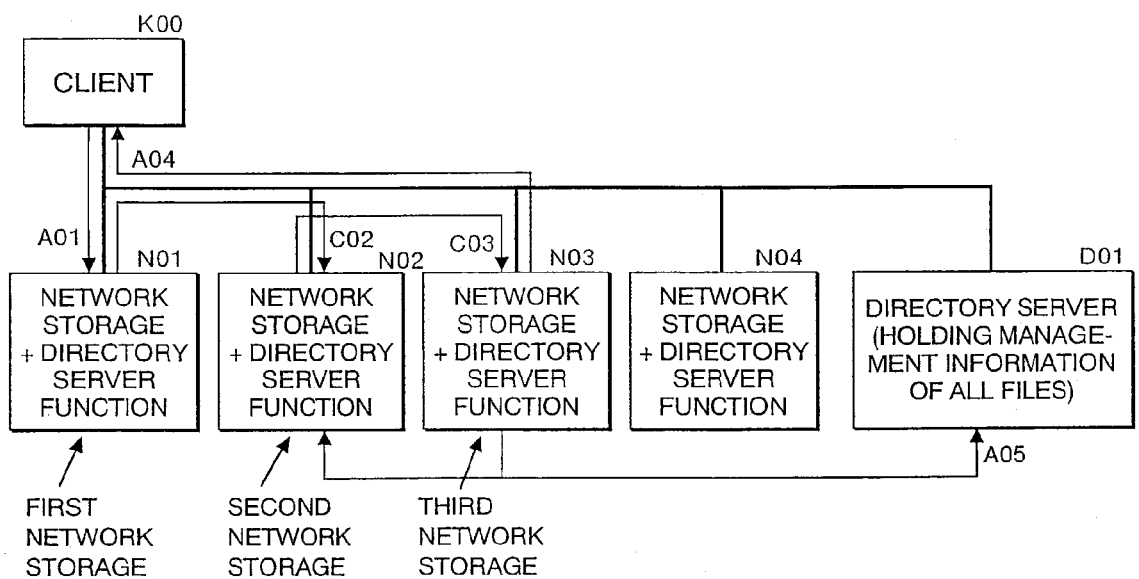
FIG. 7A and FIG. 7B are schematic diagrams illustrating flows of processes in a third embodiment of the present invention.
Figure 7B:
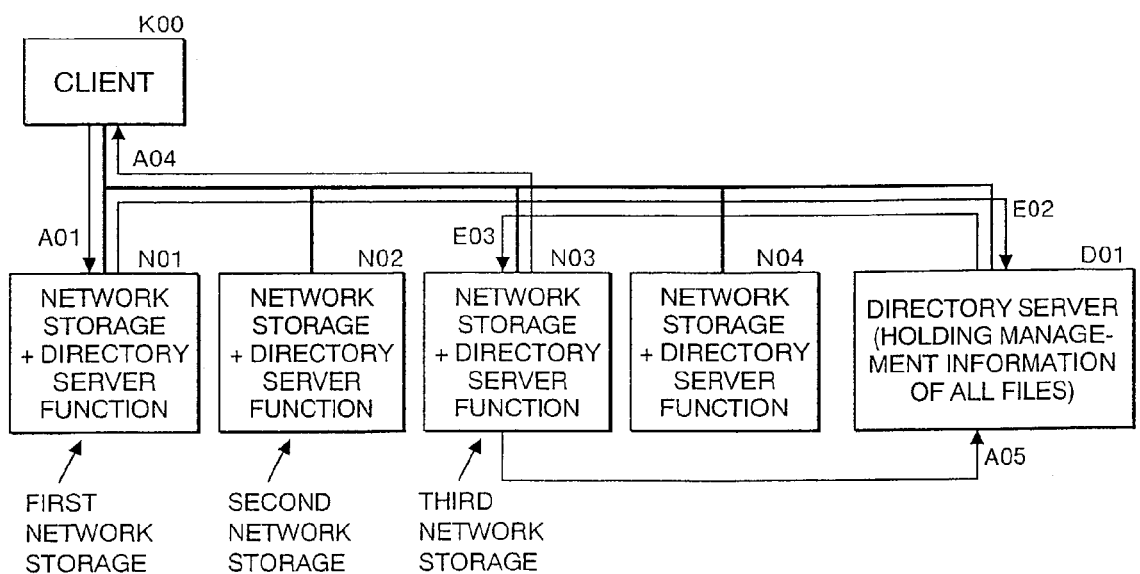

FIG. 7A and FIG. 7B are schematic diagrams illustrating flow of processes in the third embodiment of the present invention.

In the first embodiment, file management information has been completely stored in the directory servers. Therefore, when the number of directory servers is rather small and a large amount of file management information must be updated at a time because many READ/WRITE requests are issued, it is probable that loads of the directory servers are heavy and the directory servers becomes bottlenecks of system performance.

In this embodiment, in order to prevent occurrence of such situation, the directory server functions of file management are given to individual network storages. A directory server can store complete file management information as in the case of the first embodiment. File management information is divided and copied to each network storage. As a method of dividing file management information, an evaluation function given correspondence to network storage with a file handle may be used. For example, there is an evaluation function to calculate a remainder of byte expression of a file handle. Using this evaluation function, when it is assumed that N network storages are provided and the identifiers from 0 to N−1 are assigned to each network storage, a remainder of N of file handle is calculated and the file management information corresponding to such file handle is stored in the network storage having the identifier corresponding to the value of remainder.

By using the method described above, the file management information can be divided and copied to the storage device of each network storage without overlap thereof by copying such file management information to the corresponding network storage.

In this process, the client K00 issues first a file access request of the READ/WRITE request to the network storage N01 (first network storage) via the LAN (A01).

In this embodiment, since the directory server function is given to each network storage, both a directory server and network storages can process the request for file management information.

In the first embodiment, only the directory server can be transferred a request but in this embodiment, attention should be paid to the fact that both directory server and network storage may be considered as the candidates to be transferred a request.

In FIG. 7A, it is assumed that the network storage N02 (second network storage) is selected. In the case of READ/WRITE protocol, for example, the network storage N02 may be selected by obtaining a remainder of a file handle as described above.

The network storage N01 can transfer the request received to the network storage N02 (C02).

In this case, the network storage N01 simultaneously transfers the information including IP addresses of a client and the first network storage N01, transmission and reception port number, transaction ID of READ/WRITE request and the like.

The network storage N02 searches file management information from the file handle included in the request transferred and transfers the information to the network storage N03 (third network storage) which is storing the file date indicated by the file management information (C03). In this case, IP addresses of the client and the network storage N01 and the like are also transferred as in the case of the process C02.

The network storage N03 processes a request for the file data associated with the file handle included in the transferred request and transmits a result as a response to the client K00 (A04).

For transmitting the response, the network storage N03 assembles a packet to suggest as if the network storage N01 has processed the process using the information transferred including IP addresses of a client and the first network storage N01, transmission and reception port number, transaction ID of the READ/WRITE request and the like. Here, the client K00 is also not required to consider the network storage which has processed the request as in the case of the first embodiment.

Finally, since the file management information is updated such as the file access time and the like, this information is transmitted to the directory server D01 and network storage N02 (A05) to update the file management information on the directory server D01 and the network storage N02.

Accordingly, a consistency between the file management information on the network storage and that on the directory server can be maintained.

Moreover, in this case, when READ/WRITE requests are issued to many files and READ/WRITE requests are frequently issued to the same file, it is probable, in the method described above, the load of the directory server is excessively heavy because this directory server receives every time update request packets of many file management information.

Therefore, it is recommended that file management information to be sent to the directory server is accumulated on the network storage and such file management information on the directory server is collectively updated at a time in the adequate timing. In other words, amount of communication can be reduced by summarizing update request packets of many file management information to only one update request packet and moreover when the file management information to the same file is updated frequently, the update process of file management information of the directory server can be reduced because only the final result is sent as the update request packet.

In the processes illustrated in FIG. 7A, the request from the client K00 includes a file handle in the interface of request like the READ/WRITE request and the second network storage N02 storing the file management information is selected depending on such file handle.

Next, it is assumed here that the request from the client K00 does not include the file handle of the target file in its interface like the CREATE request.

In this process, as illustrated in FIG. 7B, the client K00 issues first the CREATE request to the network storage N01 (first network storage) via the LAN (A01).

In this case, the network storage N01 always selects a directory server not any of network storage. The request is transferred to the directory server D01 (E02). Moreover, the network storage N01 transfers, as in the case of FIG. 7A, the information including IP addresses of a client and the first network storage N01, transmission and reception port number, transaction ID of READ/WRITE request and the like.

The directory server D01 having received the request creates a new file handle and a new file management information and obtains, for example, the network storage N03 (third network storage) to copy the new file management information from the remainder of file handle to transmit thereto a new file creation request and a file management information storing request (E03). Furthermore the new file creation can be sent to any network storages other than the network storage N03.

The network storage N03 creates, in response to the request, a new file and stores the file management information, and then returns a response to the request of the client K00 (A04). Moreover, at the time of returning the response, the network storage N03 assembles, as in the case of FIG. 7A, a packet which suggests as if the network storage N01 has processed the request using the information transferred including IP addresses of a client and the first network storage N01, transmission and reception port number, transaction ID of READ/WRITE request and the like.

Accordingly, the file management information on the network storage N03 is updated and this information is transmitted to the directory server D01 (A05) to update the file management information on the directory server D01. Thereby, a consistency between the file management information on the network storage and that on the directory server may be maintained.

In the case as illustrated in FIG. 7, when a new network storage is added to system, identifiers are assigned to the network storages including the new network storage and division of file management information and copy to the network storage are carried out again after the data of file management information of directory server is updated.

Here, this embodiment can attain higher throughput by giving, as described above, the directory server function to the network storages to balance processing loads of file management information and to increase parallel processing property of processes. Moreover, since file management information is duplicated and stored in a network storage and a directory server and system reliability can be improved, even when a fault occurs in a certain network storage and/or directory server, this embodiment can be characterized in that missing of file management information can be prevented and system operation can continue.

Embodiment 4

Next, a fourth embodiment of the present invention will be described with reference to FIG. 8.

Figure 8:
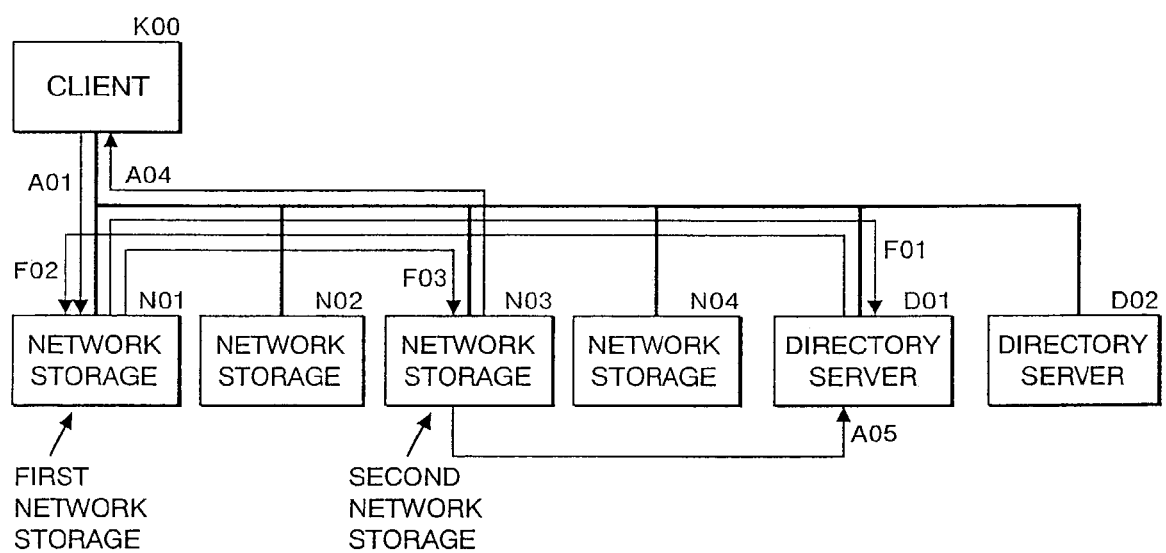
FIG. 8 is a schematic diagram illustrating flow of processes in a fourth embodiment of the present invention.

FIG. 8 is a schematic diagram illustrating flow of processes of the fourth embodiment of the present invention.

In the first embodiment, the first network storage receives a request from a client and transfers this request to a directory server. However, when capacity to be updated with the WRITE request is considerably large, a packet thereof becomes large and when this packet is transferred to a directory server, load of the directory server is large, amount of consumption of the network bandwidth is also large.

In this embodiment, the first network storage inquires to the directory server about a network storage to which a file access request has to be transferred and then transfers the request to the network storage depending on the response from the directory server. Usually, since the inquiry packet is rather smaller than the packet of WRITE request, the load of directory server is smaller and amount of packet transmitted on the network can be reduced.

In this process, the client K00 issues first a file access request to the network storage N01 (first network storage) via the LAN (A01).

Here, the network storage N01 selects the directory server D01 in which the file management information of the file is stored and requests thereto an inquiry of the network storage in which the file data is stored (F01).

The directory server D01 searches the network storage in which the relevant file is stored from the file handle included in the inquiry request and transmits a response that the relevant network storage is the network storage N03 (second network storage) (F02).

The network storage N01 receives the response and transfers the request to the network storage N03 (F03).

The network storage N03 returns a response to the client K00 by processing the request (A04) and updates the file management information of directory server (A05) as in the case of the first embodiment.

A result of inquiry is stored to a temporary storage area such as a cache of the first network storage N01 to indicate correspondence between a file identifier and a network storage identifier. When an access request is issued to the same file, information in the temporary storage area is searched. When the information is found, a request is transferred to the network storage where the relevant file is stored immediately. This flow is similar to that illustrated in FIG. 6B.

Effect of Invention Understood from Preferred Embodiments

As can be understood from description of the preferred embodiments, the present invention can provide a network storage virtualization method which can make access by utilizing the standard protocol such as the NFS.

Moreover, the present invention can provide a network storage virtualization method which assures lower management cost for expansion and reduction of network storages.

In addition, the present invention can provide a network storage virtualization method which assures continuous operation even when a fault occurs by giving redundancy to file management information.

Moreover, the present invention can provide a network storage virtualization method which assures that even when the network storage which receives requests from clients is different from the network storage which returns responses to clients after processing the requests, clients can issue requests to the network storage without considering such difference.

What is claimed is:

1. A network storage virtualization method for accessing to network storage storing file data from a client, wherein a directory server is provided to store file management information, said method, when a request to access a file is issued to the network storage from the client, comprising the steps of:

receiving the request to access a file from the client by a first network storage;

transferring the received request to access a file, along with a first Internet Protocol (IP) address of the client, a second IP address of the first network storage, and a transmitting and receiving port number for transmitting and receiving packets, to the directory server from the first network storage, wherein along with the request being transferred the first IP address identifies a source of the request and the second IP address identifies a destination of the request;

selecting a second network storage as the network storage for processing the request to access a file by the directory server based on the file management information, the second network storage having a third IP address;

transferring the request to access a file, along with the first IP address of the client, the second IP address of the first network storage and the transmitting and receiving port number, to the selected second network storage from the directory server;

processing the request to access a file on the second network storage to obtain a result of the processing of the request; and transmitting, from the second network storage, the result of the processing of the request to access a file to the client, by using the second IP address of the first network storage as identifying a source of the result being transmitted in place of the third IP address of the second network storage, the first IP address of the client as identifying a destination of the result being transmitted and the transmitting and receiving port number, wherein the processing step comprises the steps of:

upon processing the request to access a file, by the second network storage, sending an update request to the directory server to update a file attribute of the file being accessed, and updating the file attribute of the file being accessed, said updating including updating at least an access time of the file being accessed.

2. A network storage virtualization method according to claim 1, wherein a plurality of the directory servers are provided and a process to select a directory server for transferring the received request is included in the transferring the received request step.

3. A network storage virtualization method according to claim 1, further comprising:

a step for notifying that the second network storage is selected as the network storage for processing the request as a result of the selecting step to the first network storage from the directory server.

4. A network storage virtualization method according to claim 3, wherein the first network storage stores the notified constants from the directory server in a temporary storage area thereof.

5. A network storage virtualization method according to claim 4, wherein correspondence between a file identifier included in the request and an identifier of the network storage to process the request is included as the stored content in the temporary storage area.

6. A network storage virtualization method according to claim 5, further comprising, when the client issues a second request as another access request to access a file to the first network storage, the steps of:

receiving the second request from the client with the first network storage;

searching a file identifier included in the second request received by the first network storage within the temporary storage area; and transferring the second request to the network storage corresponding to the file identifier from the first network storage when the file identifier is found with the search process.

7. A network storage virtualization method for accessing to a network storage storing file data from a client, wherein a directory server is provided to store file management information, file management information stored in the directory server is divided and is also stored in a plurality of the network storages said method, when a request to access a file is issued to the network storage from the client, comprising the steps of:

receiving the request to access a file from the client by a first network storage;

selecting the directory server or second network storage for transferring the request to access a file by the first network storage;

transferring the request to access a file, along with a first Internet Protocol (IP) address of the client, a second IP address of the first network storage, and a transmitting and receiving port number for transmitting and receiving packets, to the selected directory server or second network storage by the first network storage, the second network storage having a third IP address, wherein along with the request being transferred the first IP address identifies a source of the request and the second IP address identifies a destination of the request;

selecting, when the directory server is selected, a third network storage to process the request to access a file by the directory server based on the file management information or selecting, when the second network storage is selected, the third network storage to process the request to access a file by the second network storage based on the file management information which is divided and stored, the third network storage having a fourth IP address;

transferring the request to access a file, along with IP addresses of the client and the first network storage, to the third network storage by the selected directory server or the second network storage;

processing the request to access a file by the third network storage to obtain a result of the processing of the request; and transmitting, from the third storage, the result of the request to access a file processed by the third network storage to the client by using the second IP address of the first network storage as identifying a source of the result being transmitted in place of the third IP address of the second network storage or the fourth IP address of the third network storage, the first IP address of the client as identifying a destination of the result being transmitted and the transmitting and receiving port number, wherein the processing step comprises the steps of:

upon processing the request to access a file, by the third network storage, sending an update request to at least the directory server to update a file attribution of the file being accessed, and updating the file attribution of the file being accessed, said updating including updating at least an access time of the file being accessed.

8. A network storage virtualization method according to claim 7, further comprising a step of:

notifying to the first network storage, that as a result of the selecting step, the directory server or the second network storage has selected, the third network storage as the network storage to process the request.

9. A network storage virtualization method according to claim 8, wherein the first network storage stores the content of the notification of the directory server or the second network storage in a temporary storage area.

10. A network storage virtualization method according to claim 9, wherein correspondence between a file identifier included in the request and an identifier of the network storage to process the request is included in the content stored in the temporary storage area.

11. A storage network storage virtualization method according to claim 10, further comprising, when the client has issued a second request as the other access request to the first network storage, the steps of:
receiving the second request from the client by the first network storage;
searching a file identifier included in the second request received by the first network storage in the temporary storage area; and
transferring, when the file identifier is found with the search process, the second request to the network storage corresponding to the file identifier from the first network storage.

12. A network storage virtualization method for accessing to network storage storing file data from a client, wherein a directory server is provided to store file management information, said method, when the client issues a request to access a file to the network storage, comprising the steps of:
receiving the request to access a file from the client by a first network storage;
inquiring for a network storage to process the received request to access a file to the directory server from the first network storage;
selecting a second network storage as the network storage to process the request to access a file based on the file management information by the directory server;
notifying that the second network storage is selected to the first network storage by the directory server;
transferring the request to access a file, along with a first Internet Protocol (IP) address of the client, a second IP address of the first network storage, and a transmitting and receiving port number for transmitting and receiving packets, to the selected second network storage based on the notification from the first network storage, the second network storage having a third IP address,
wherein along with the request being transferred the first IP address identifies a source of the request and the second IP address identifies a destination of the request;
processing the request to access a file in the second network storage to obtain a result of the processing of the request; and
transmitting, from the second storage, the result of the processing of the request to access a file to the client, by using the second IP address of the first network storage as identifying a source of the result being transmitted in place of the third IP address of the second network storage, the first IP address of the client as identifying a destination of the result being transmitted and the transmitting and receiving port number,
wherein the processing step comprises the steps of:
upon processing the request to access a file, by the second network storage, sending an update request to the directory server to update a file attribution of the file being accessed, and
updating the file attribution of the file being accessed, said updating including updating at least an access time of the file being accessed.

13. A network storage virtualization method according to claim 12, wherein the first network storage stores content of the notification of the directory server in a temporary storage area.

14. A network storage virtualization method according to claim 13, wherein correspondence between a file identifier included in the request and an identifier of the network storage to process the request is included in content stored in the temporary storage area.

15. A network storage virtualization method according to claim 14, said method, when the client has issued a second request as the other request to the first network storage, further comprising the steps of:
receiving a second request from the client by a first network storage;
searching, within the temporary storage area, a file identifier included in the second request received by the first network storage; and
transferring, when the file identifier is found with the search process, the second request from the first network storage to the network storage corresponding to the file identifier.

16. A network storage virtualization method for accessing to a network storage storing file data from a client, wherein a directory server to store file management information is provided, wherein file management information stored in the directory server is divided and stored into a plurality of the network storages, said method, when a request to access a file is issued to the network storage from the client; comprising the steps of:
receiving the request to access a file from the client by a first network storage;
selecting the directory server or a second network storage to transfer the request to access a file by the first network storage;
transferring the request to access a file, along with a first Internet Protocol (IP) address of the client, the second IP address of the first network storage, and a transmitting and receiving port number for transmitting and receiving packets, to the directory server or the second network storage from the first network storage, the second network storage having a third IP address,
wherein along with the request being transferred the first IP address identifies a source of the request and the second IP address identifies a destination of the request;
selecting, when the directory server is selected, a third network storage to process the request to access a file based on the file management information by the directory server, or selecting, when the second network storage is selected, the third network storage to process the request to access a file based on the divided and stored file management information by the second directory server, the third network storage having a third IP address;
notifying that the third network storage is selected to the first network storage from the directory server or the second network storage;
transferring the request to access a file, along with the first IP address of the client, the second IP address of the first network storage and the transmitting and receiving port number, to the third network storage selected based on the notification from the first network storage;
processing the request to access a file in the third network storage to obtain a result of the processing of the request; and
transmitting, from the third network storage, the result of processing the request to access a file, by using the second IP address of the first network storage as identifying a source of the result being transmitted in place of the third IP address of the second network storage or the fourth IP address of the third network storage, the first IP address of the client as identifying a destination of the result being transmitted and the transmitting and receiving port number, wherein the processing step comprises the steps of:

upon processing the request to access a file, by the second network storage, sending an update request to the directory server to update a file attribution of the file being accessed, and updating the file attribution of the file being accessed, said updating including updating at least an access time of the file being accessed.

17. A network storage system comprising:

at least one network storage for storing file data;

a client for accessing the file data stored in the network storage; and a directory server which stores file management information of said file data, wherein, when the client has issued a request to access a file to a first network storage, transferring a received request, along with a first Internet Protocol (IP) address of the client, a second IP address of the first network storage, and a transmitting and receiving port number for transmitting and receiving packets, to the directory server from the first network storage, wherein along with the request being transferred the first IP address identifies a source of the request and the second IP address identifies a destination of the request, selecting a second network storage, having a third IP address, to process the request to access a file by the directory server in order to transfer the request to access a file, along with the first IP address of the client, the second IP address of the first network storage and the transmitting and receiving port number, to the second network storage, and processing the request to access a file by the second network storage to obtain a result of the processing of the request and transmitting, from the second network storage, the result of the processing of the request to access a file, by using the second IP address of the first network storage as identifying a source of the result being transmitted in place of the third IP address of the second network storage, the first IP address of the client as identifying a destination of the result being transmitted and the transmitting and receiving port number, wherein the processing includes, upon processing the request to access a file, by the second network storage, sending an update request to the directory server to update a file attribution of the file being accessed, and updating the file attribution of the file being accessed, said updating including updating of at least an access time of the file being accessed.

18. A network storage system according to claim 17, wherein the results of processing the request in the second network storage, includes, a response which suggests as if the request has been processed in the first network storage.

19. A network storage system according to claim 18, wherein an identifier of the first network storage is included in a response packet of the process result assembled within the second network storage, causing the client to recognize as if the request has been processed by the first network storage.

20. A network storage system according to claim 17, wherein a plurality of the directory servers are provided and the first network storage transfers the request to a directory server selected from a plurality of the directory servers.

21. A network storage system according to claim 20, wherein file management information stored in the directory servers are stored to maintain the consistency thereof.

22. A network storage system according to claim 17, wherein the directory server evaluates the file identifier in the received request by an evaluation function to obtain an identifier of the second network storage.

23. A network storage system according to claim 17, wherein the directory server evaluates, load of a plurality of network storages and selects a network storage having lower load as the second network storage to create a new file.

24. A network storage system comprising:

at least one network storage for storing file data;

a client for accessing the file data stored in the network storage; and a directory server which stores file management information, wherein the file management information stored in the directory server is divided and stored in a plurality of the network storages, wherein, when the client has issued a request to access a file to the network storage, selecting the directory server or a second network storage to transfer the request to access a file, along with a first Internet Protocol (IP) address of the client, a second IP address of the first network storage and a transmitting and receiving port number for transmitting and receiving packets, by a first network storage having received the request to access a file, the second network storage having a third IP address, and transferring the request to access a file, along with the first IP address of the client, the second IP address of the first network storage and the transmitting and receiving port number, to any one of the directory server or the second network storage therefrom, wherein along with the request being transferred the first IP address identifies a source of the request and the second IP address identifies a destination of the request, selecting a third network storage, having a fourth IP address, to process the request to access a file based on the file management information by the directory server or the second network storage server having received the request to access a file and transferring the request to access a file, along with the first IP address of the client, the second IP address of the first network storage and the transmitting and receiving port number, to the third network storage, processing, by the third network storage, the request to access a file in the third network storage, and transmitting a result of the processing of the request to access a file, by using the second IP address of the first network storage as identifying a source of the result being transmitted in place of the third IP address of the second network storage or the fourth IP address of the third network storage, the first IP address of the client as identifying a destination of the result being transmitted and the transmitting and receiving port number, and wherein the processing includes, upon processing the request to access a file, by the third network storage, sending an update request to the directory server to update a file attribution of the file being accessed, and updating the file attribution of the file being accessed, said updating including updating of at least an access time of the file being accessed.

25. A network storage system according to claim 24, wherein file management information stored in a plurality of the network storages is stored to maintain the consistency with file management information stored in the directory server.

26. A network storage system according to claim 24, wherein, to divide and store file management information stored in the directory server to a plurality of the network storages, evaluating a file identifier in individual file management information stored in the directory server with an evaluation function evaluating file identifiers to return a network storage identifier, and dividing the file management information to a plurality of the network storages depending on a result of evaluations.

27. A network storage system according to claim 24, wherein file management information of a new file is added to the directory server and thereafter the directory server adds the file management information of the new file to at least one network storage of a plurality of the network storages.

28. A network storage system according to claim 24, wherein the network storage storing file management information updates the file management information at the time of updating the file management information, and the network storage requests, thereafter, for update of the file management information to the directory server storing the file management information updated in the network.

29. A network storage system according to claim 28, wherein the network storage accumulates updated contents of the file management information and the network storage requests the directory server to update the file management information corresponding to the contents updated in the network storage.

* * * * *

UNITED STATES PATENT AND TRADEMARK OFFICE
CERTIFICATE OF CORRECTION

| | | |
|---|---|---|
| PATENT NO. | : 7,433,934 B2 | Page 1 of 1 |
| APPLICATION NO. | : 10/368644 | |
| DATED | : October 7, 2008 | |
| INVENTOR(S) | : Tetsuya Uemura et al. | |

It is certified that error appears in the above-identified patent and that said Letters Patent is hereby corrected as shown below:

ON THE TITLE PAGE:

Item (73) Assignee: should read

-- HITACHI GLOBAL STORAGE TECHNOLOGIES JAPAN, LTD., Kanagawa (JP) --.

Signed and Sealed this
Ninth Day of August, 2011

David J. Kappos
*Director of the United States Patent and Trademark Office*